(12) United States Patent
Ryoo et al.

(10) Patent No.: US 11,062,847 B2
(45) Date of Patent: *Jul. 13, 2021

(54) CAPACITOR COMPONENT AND METHOD FOR MANUFACTURING THE SAME

(71) Applicant: SAMSUNG ELECTRO-MECHANICS CO., LTD., Suwon-si (KR)

(72) Inventors: Hye Won Ryoo, Suwon-si (KR); Ji Hong Jo, Suwon-si (KR); Ho In Jun, Suwon-si (KR); Seok Keun Ahn, Suwon-si (KR); Ji Hye Yu, Suwon-si (KR); A Reum Jun, Suwon-si (KR); Gi Seok Jeong, Suwon-si (KR); Seon Young Yoo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/848,107

(22) Filed: Apr. 14, 2020

(65) Prior Publication Data
US 2020/0243263 A1  Jul. 30, 2020

Related U.S. Application Data

(63) Continuation of application No. 16/277,454, filed on Feb. 15, 2019, now Pat. No. 10,658,115.

(30) Foreign Application Priority Data

Nov. 22, 2018  (KR) .................. 10-2018-0145453

(51) Int. Cl.
*H01G 4/224* (2006.01)
*H01G 4/30* (2006.01)
(Continued)

(52) U.S. Cl.
CPC ............... *H01G 4/224* (2013.01); *H01G 4/12* (2013.01); *H01G 4/30* (2013.01); *C04B 35/4682* (2013.01);
(Continued)

(58) Field of Classification Search
CPC .................................. H01G 4/30; H01G 4/224
See application file for complete search history.

(56) References Cited

U.S. PATENT DOCUMENTS 10,658,115 B1 * 5/2020 Ryoo ..................... H01G 4/224
2001/0055192 A1  12/2001 Nakano
(Continued)

FOREIGN PATENT DOCUMENTS

JP  H11-067574 A  3/1999
JP  H11-340090 A  12/1999
(Continued)

OTHER PUBLICATIONS

U.S. Notice of Allowance dated Jan. 17, 2020 issued in U.S. Appl. No. 16/277,454.
(Continued)

*Primary Examiner* — Eric W Thomas
(74) *Attorney, Agent, or Firm* — Morgan, Lewis & Bockius LLP

(57) ABSTRACT

A method for manufacturing a capacitor component includes an operation of sintering under a moderately-or-more reducing atmosphere for hydrogen, a body in which a plurality of dielectric layers having internal electrodes printed thereon are laminated,; a first reoxidation operation of subjecting the sintered body to a first reoxidation heat treatment under an oxidizing atmosphere; and a second reoxidation operation of subjecting the body having undergone the first reoxidation heat treatment to a second reoxidation heat treatment under an oxidizing atmosphere.

19 Claims, 8 Drawing Sheets

(51) Int. Cl.
*H01G 4/12* (2006.01)
*H01G 4/012* (2006.01)
*H01G 4/232* (2006.01)
*C04B 35/468* (2006.01)
*H01G 4/008* (2006.01)

(52) U.S. Cl.
CPC ............ *H01G 4/008* (2013.01); *H01G 4/012* (2013.01); *H01G 4/1227* (2013.01); *H01G 4/232* (2013.01)

(56) References Cited

U.S. PATENT DOCUMENTS

| | | |
|---|---|---|
| 2006/0213604 A1 | 9/2006 | Fukui et al. |
| 2011/0141660 A1 | 6/2011 | Jeong |
| 2014/0204502 A1 | 7/2014 | Chun |
| 2014/0301012 A1 | 10/2014 | Kim |
| 2015/0077898 A1 | 3/2015 | Chung et al. |
| 2016/0284473 A1 | 6/2016 | Murosawa |
| 2017/0365407 A1 | 12/2017 | Morita et al. |

FOREIGN PATENT DOCUMENTS

| | | |
|---|---|---|
| KR | 10-2006-0103191 A | 9/2006 |
| KR | 10-2014-0106315 A | 9/2014 |
| KR | 10-2015-0013921 A | 2/2015 |
| KR | 10-2015-0031908 A | 3/2015 |
| KR | 10-2017-0142851 A | 12/2017 |

OTHER PUBLICATIONS

U.S. Non-Final Office Action dated Aug. 30, 2019 issued in U.S. Appl. No. 16/277,454.
Korean Office Action dated Jan. 15, 2020 issued in Korean Patent Application No. 10-2018-0145453 (with English translation).
Korean Office Action dated Jun. 26, 2020 issued in Korean Patent Application No. 10-2018-0145453 (with English translation).

\* cited by examiner

'P3'

CAPACITOR COMPONENT AND METHOD FOR MANUFACTURING THE SAME

CROSS-REFERENCE TO RELATED APPLICATIONS

This application is a continuation of U.S. patent application Ser. No. 16/277,454, filed on Feb. 15, 2019 which claims the benefit of priority to Korean Patent Application No. 10-2018-0145453 filed on Nov. 22, 2018 in the Korean Intellectual Property Office, the disclosures of which are incorporated herein by reference in their entireties.

TECHNICAL FIELD

The present disclosure relates to a capacitor component and a method for manufacturing the same.

BACKGROUND

A multilayer ceramic capacitor is a chip-type condenser mounted on the printed circuit boards of a variety of electronic products such as image display devices, including liquid crystal displays (LCDs), plasma display panels (PDPs), and the like, computers, smartphones, mobile phones, and the like, serving to charge or discharge electricity.

Such a multilayer ceramic capacitor may be used as a component of various electronic devices as it is relatively small in size, and is able to secure high capacitance and convenient to install. As electronic devices such as computers and mobile devices are becoming increasingly miniaturized and increased in power, there has been increased demand for a multilayer ceramic capacitor having a compact size and high capacitance.

Further, as there has been increasing interest in vehicle components in related industries, multilayer ceramic capacitors are increasingly required to have high reliability and high strength characteristics in order to be used in vehicles or infotainment systems.

In the above context, to achieve high capacitance characteristics and reliable temperature coefficient of capacitance (TCC) characteristics, sintering may be performed under a moderately-or-more reducing atmosphere for hydrogen, rather than under mildly reducing sintering conditions commonly used in conventional manufacturing processes. However, as sintering is performed under a moderately-or-more reducing atmosphere for hydrogen, a large quantity of oxygen vacancies may be formed inside dielectric layers, thus causing an undesirable decrease in reliability.

SUMMARY

An aspect of the present disclosure is to provide a capacitor component having excellent reliability and a method for manufacturing the same.

According to an aspect of the present disclosure, a method for manufacturing a capacitor component includes an operation of sintering a body in which a plurality of dielectric layers having internal electrodes printed thereon are laminated, under a moderately-or-more reducing atmosphere for hydrogen; a first reoxidation operation of subjecting the sintered body to a first reoxidation heat treatment under an oxidizing atmosphere; and a second reoxidation operation of subjecting the body having undergone the first reoxidation heat treatment to a second reoxidation heat treatment under the oxidizing atmosphere.

According to another aspect of the present disclosure, a multilayer ceramic capacitor includes: a body including a dielectric layer and first and second internal electrodes opposing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and first and second external electrodes disposed on an outer side of the body and electrically connected to the first and second internal electrodes, respectively. The body includes a capacitance forming portion including the first and second internal electrodes opposing each other with the dielectric layer interposed therebetween to form capacitance, cover portions disposed in upper and lower surfaces of the capacitance forming portion and including a plurality of pores, and margin portions disposed on side surfaces of the capacitance forming portion, and a substantial portion of the plurality of pores are filled with glass.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
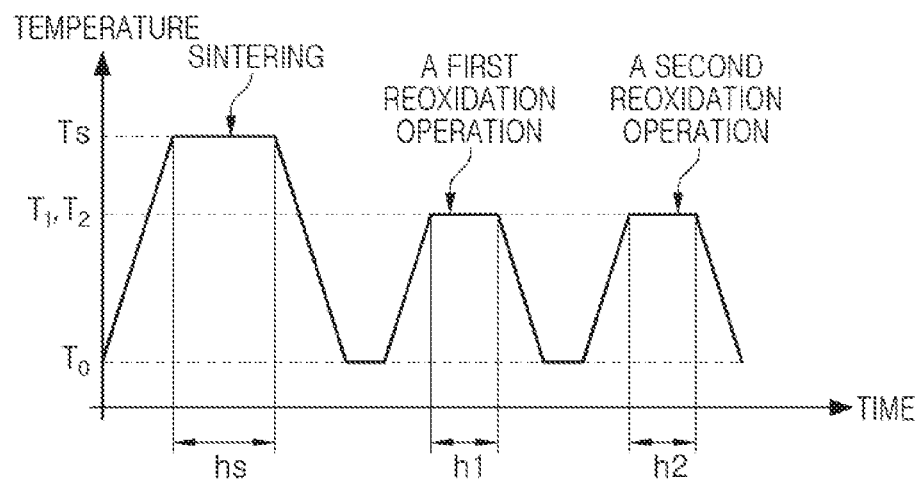
FIG. 1 is a schematic graph illustrating a heat treatment process for a body according to an exemplary embodiment in the present disclosure.

Hereinafter, embodiments of the present disclosure will be described in detail with reference to the accompanying drawings. The embodiments of the present disclosure may, however, be modified in many different forms, and accordingly, the scope of the present disclosure should not be construed as being limited to the embodiments set forth herein. Rather, these embodiments are provided to provide thorough understanding to those skilled in the art. Accordingly, in the drawings, the shapes and dimensions of elements maybe exaggerated for clarity, and the same reference numerals will be used throughout to designate the same or like elements.

Further, in the drawings, irrelevant descriptions will be omitted to clearly describe the present disclosure, and to clearly express a plurality of layers and areas, thicknesses may be magnified. Elements having the same function within the scope of the same concept will be described with use of the same reference numeral. Further, throughout the specification, it will be understood that when a part "includes" an element, it may further include another element, not excluding another element, unless otherwise indicated.

In the drawings, an X direction may be defined as a second direction, an L direction, or a length direction, a Y direction as a third direction, a W direction, or a width direction, and a Z direction as a first direction, a laminating direction, a T direction, or a thickness direction.

Hereinbelow, a method for manufacturing a capacitor component according to an exemplary embodiment in the present disclosure will be described, and subsequently, a capacitor component according to an exemplary embodiment in the present disclosure will be described.

Method for Manufacturing Capacitor Component

FIG. 1 is a schematic graph showing a heat treatment process for a body according to an exemplary embodiment.

Referring to FIG. 1, the method for manufacturing a capacitor component according to the exemplary embodiment includes: an operation of sintering a body in which a plurality of dielectric layers having internal electrodes printed thereon are laminated, under a reducing atmosphere; a first reoxidation operation of subjecting the sintered body to a first reoxidation heat treatment under an oxidizing atmosphere; and a second reoxidation operation of subjecting the body having undergone the first reoxidation heat treatment to a second reoxidation heat treatment under an oxidizing atmosphere.

In addition, prior to the operation of sintering a body, an operation of preparing a body may be performed.

The operation of preparing a body may involve preparing a conductive paste for an internal electrode, which contains a metal powder, a ceramic powder, and a binding resin.

The metal powder may include silver (Ag), lead (Pb), platinum (Pt), nickel (Ni), copper (Cu), or the like. For example, of the aforementioned metal powders, only one kind may be used singly or two or more kinds may be used in combination without being limited thereto.

In addition, the metal powder may have a different particle size according to exemplary embodiments. For example, the metal powder may have a particle size of 50-400 nm.

The method for dispersing the metal powder in the conductive paste is not limited to any particular method. For example, the metal powder may be dispersed in a conductive paste composition by using a 3-roll mill.

The resin is not limited to any particular material. For example, the resin may include at least one of polyvinyl butyral (PVB) and ethyl cellulose (EC), or a mixture thereof.

The ceramic powder is not limited to any particular material as long as it is for controlling the sintering shrinkage of metal powder. For example, the ceramic powder may be at least one selected from the group consisting of $BaTiO_3$, $Ba(TiZr)O_3$, $CaZrO_3$, and $SrZrO_3$.

The method for dispersing the ceramic powder in the conductive paste is not limited to any particular method. For example, the ceramic powder may be dispersed in the conductive paste by using a beads mill.

The ceramic powder may have a different particle size according to exemplary embodiments. For example, the ceramic powder may have an average particle size of 10-200 nm.

The particle size of the ceramic powder may be determined proportionally to the particle size of the metal powder, and may be preferably in the range of 10-200 nm as described above.

Subsequently, a plurality of green sheets may be prepared.

The ceramic green sheet may be prepared by mixing a ceramic powder, a binder, and a solvent to prepare a slurry, and then, forming the slurry into a sheet type having several micrometers by a doctor blade method.

Subsequently, an internal electrode may be formed by applying the conductive paste onto the green sheet.

Once the internal electrode is formed as described above, the green sheet may be separated from a carrier film, and then, a plurality of the green sheets may be laminated one on top of the other to form a laminate.

Thereafter, the laminate of green sheets may be compressed under high temperature and high pressure, and the compressed sheet laminate may be cut in a predetermined size through a cutting process to produce a body.

When the compression is performed, a compression pressure may be preferably set to 500-1,300 $kgf/cm^2$.

Sintering Operation

Next, a sintering operation may be performed to sinter a body in which a plurality of dielectric layers having internal electrodes printed thereon are laminated, under a moderately-or-more reducing atmosphere for hydrogen.

The reducing atmosphere refers to a gas atmosphere capable of reducing oxides, and may be classified into a strongly reducing atmosphere, a moderately reducing atmosphere, and a mildly reducing atmosphere, depending on the reducing power of the atmosphere.

When the sintering operation is performed under a reducing atmosphere, oxygen vacancies maybe formed, which gain mobility under high-temperature conditions where an electric field is transferred, thus causing degradation in reliability of the capacitor component.

Figure 2:
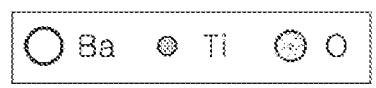
FIG. 2 illustrates the change in oxygen vacancy before a first reoxidation operation and after a second reoxidation operation.
Figure 2:
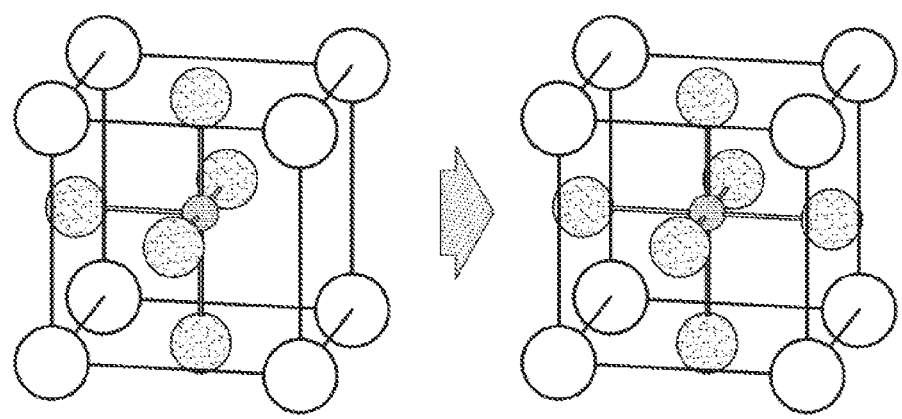

In particular, the oxygen vacancies, as illustrated on the left in FIG. 2, refer to empty pores formed in the positions of oxygen atoms.

Since capacitor components for vehicles are required to have high capacitance and high reliability, the sintering operation has been performed under a moderately-or-more reducing atmosphere for hydrogen, not under mildly reducing sintering conditions often used in conventional manufacturing processes, in order to achieve high capacitance characteristics and reliable temperature coefficient of capacitance (TCC) characteristics.

However, when the sintering operation is performed under a moderately-or-more reducing atmosphere for hydrogen, a larger quantity of oxygen vacancies may be formed inside dielectric layers compared to under mildly reducing sintering conditions, thus giving rise to issues including an undesirable decrease in reliability and the like.

Conventionally, a reoxidation process was performed to reduce the quantity of oxygen vacancies, however, as the sintering operation is performed under a moderately-or-more reducing atmosphere for hydrogen, a large quantity of oxygen vacancies is formed inside dielectric layers. Thus, it may be difficult to reduce the quantity of oxygen vacancies to a level that would not adversely affect reliability only through a conventional reoxidation process.

However, as will be described below, the quantity of oxygen vacancies may be significantly reduced through controlling the conditions of the reoxidation process.

In detail, the moderately-or-more reducing atmosphere for hydrogen may be a gas atmosphere in which nitrogen gas ($N_2$) is mixed with 1% or more to 2% or less hydrogen gas ($H_2$).

In general, a sintering time (hs) for the body may widely vary from one hour to 30 hours, and may further vary depending on the capacitance, the ceramic composition, the composition of internal electrodes, and the like. Therefore, the sintering time (hs) is not limited to any particular duration.

The sintering temperature ($T_s$) is not limited to any particular temperature, however, the sintering operation may be performed at a temperature higher than first and second reoxidation temperatures, which will be described below. For example, the sintering temperature ($T_s$) may be in the range of 1,000-1,200° C.

Reoxidation Operation

A reoxidation operation according to the present disclosure includes a first reoxidation operation of subjecting the sintered body to a first reoxidation heat treatment under an oxidizing atmosphere, and a second reoxidation operation of subjecting the body having undergone the first reoxidation operation to a second reoxidation heat treatment under an oxidizing atmosphere.

FIG. 2 illustrates the change in oxygen vacancy before a first reoxidation operation and after a second reoxidation operation.

As described above, since the sintering operation according to the present disclosure is performed under a moderately-or-more reducing atmosphere for hydrogen, a large quantity of oxygen vacancies may be formed. However, once the first and second reoxidation operations according to the present disclosure are performed, the oxygen vacancies are filled as illustrated in FIG. 2, significantly reducing the quantity of oxygen vacancies.

Figure 3:
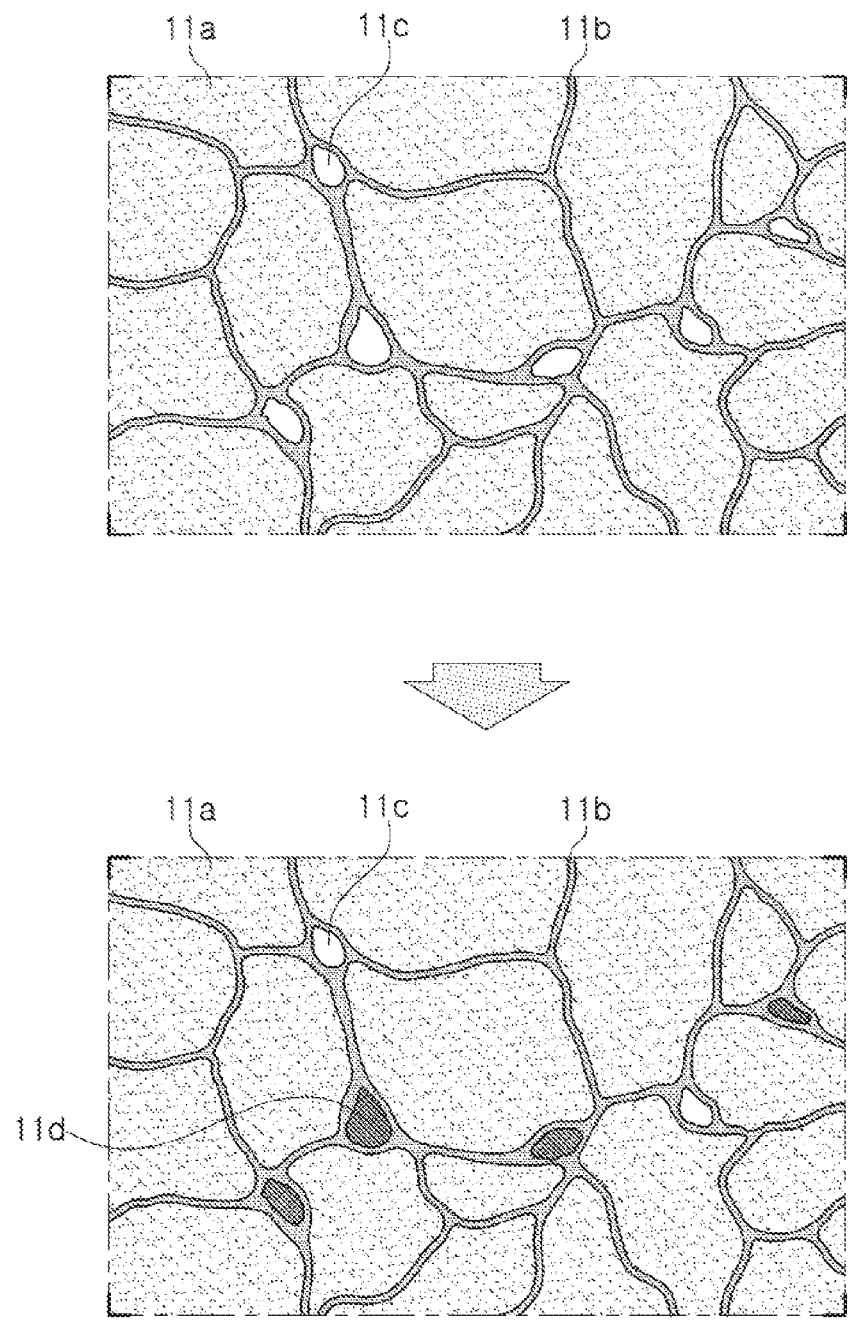
FIG. 3 illustrates the change in pores before a first reoxidation operation and after a second reoxidation operation.

FIG. 3 illustrates changes in pores before the first reoxidation operation and after the second reoxidation operation. FIG. 3 may be an enlarged view of a cover portion 112 adjacent to a band portion B of an external electrode, or may be an enlarged view of region P3 shown in FIG. 10.

A plurality of pores 11c may be present before the first reoxidation operation, however, once the first and second reoxidation operations are performed according to the present disclosure, due to movement of glass 11d occurring at a reoxidation temperature, the glass 11d may fill the plurality of pores 11c present in cover portions 112 and 113 of the body.

Accordingly, the hardness of the body may be improved, and paths through which a plating liquid or humidity could permeate may be reduced, and thus, reliability may be improved.

In particular, the glass 11d may include at least one selected from a silicon oxide, an aluminum oxide, and a complex oxide thereof.

Figure 4:
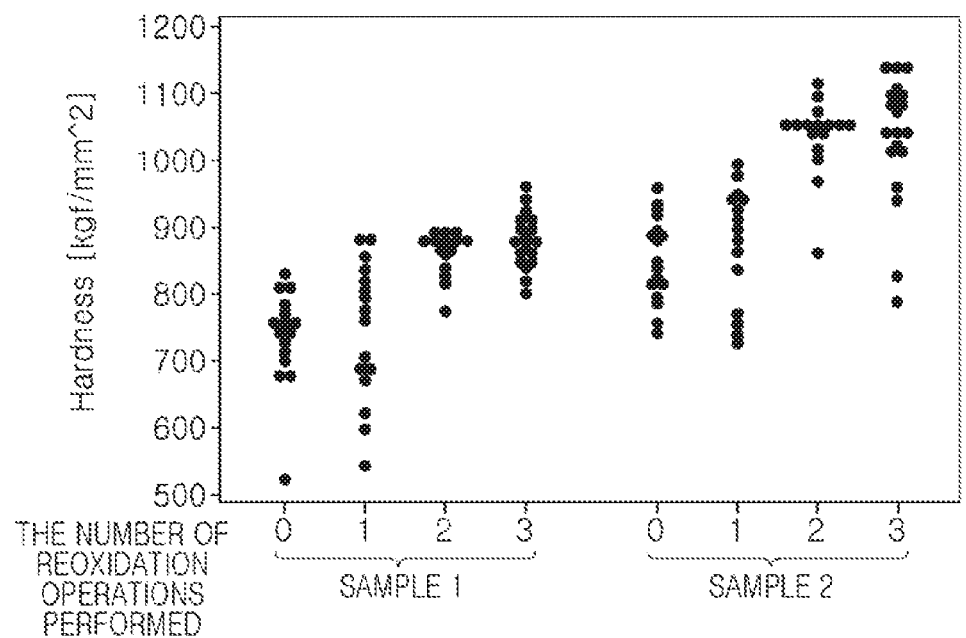
FIG. 4 is a graph showing changes in hardness in accordance with the number of reoxidation operations performed.

FIG. 4 is a graph showing changes in hardness of a cover portion in accordance with the number of reoxidation operations performed.

Figure 5:
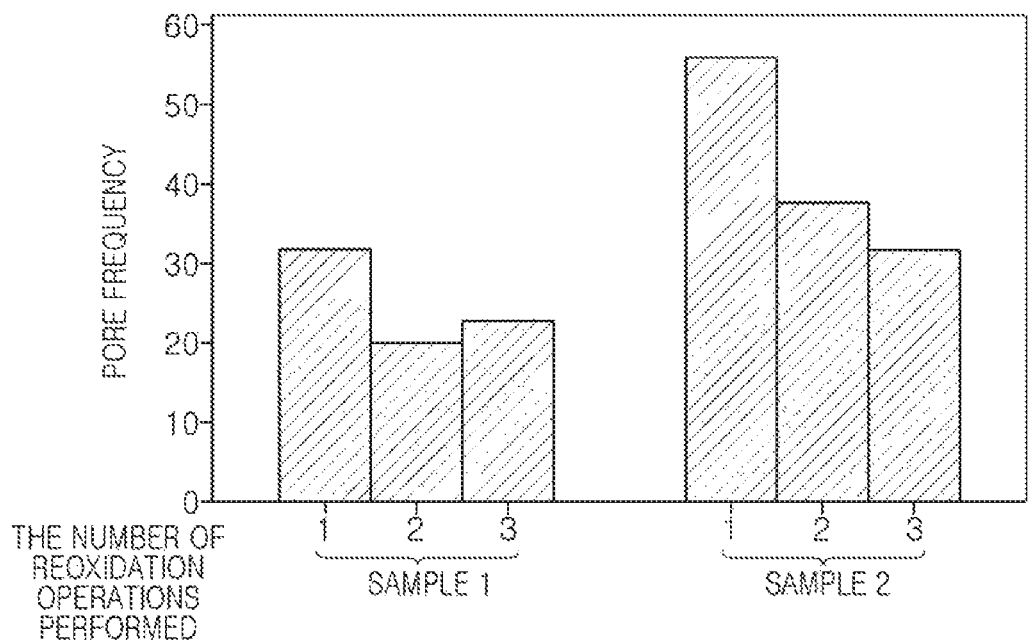
FIG. 5 is a graph showing the pore frequency in a cover portion in accordance with the number of reoxidation operations performed.

FIG. 5 is a graph showing pore frequency in a cover portion in accordance with the number of reoxidation operations performed.

Referring to FIG. 4 and FIG. 5, a binder was additionally added in Sample 2 to secure a higher hardness than that of Sample 1, and each of the reoxidation heat treatments was performed at 1,060° C. for 10 hours under an oxidizing atmosphere.

Referring to FIG. 4, twenty samples were prepared for each Sample, and changes in hardness were observed while increasing the number of reoxidation operations performed. It was observed that when the reoxidation operation was performed twice, the mean value of hardness had increased, while deviations in hardness had decreased.

Referring to FIG. 5, after five points were arbitrarily selected from the cover portion of the body, frequency of the pores having a diameter of 1-2 μm was observed in areas having the size of 17 μm*22.6 μm. Changes in pore frequency were observed while increasing the number of reoxidation operations performed. It was observed that the pore frequency had decreased when the reoxidation operation was performed twice, where the pore frequency was measured as the number of empty pores not filled with the glass 11d.

Also, when a percentage of the pores filled with the glass 11d, with respect to the total number of pores having a diameter of 1-2 μm, was analyzed, the percentage of such pores in Sample 1 subjected to the reoxidation operation twice, was 81%, and the percentage of such pores in Sample 2 subjected to the reoxidation operation twice, was 94%.

Also, it was observed that even when the reoxidation operation was performed three times, changes in hardness or pore frequency were negligible compared to when the reoxidation operation was performed twice. Accordingly, performing the reoxidation operation twice may be both economical and efficient.

In detail, each of first and second reoxidation heat treatment temperatures T1 and T2 may be in the range of 800-1,200° C.

At a temperature below 800° C., the glass may have insufficient mobility, resulting in insufficient filling of the pores in the cover portions and the margin portions.

The reoxidation heat treatment temperature higher than a sintering temperature of the previous step may be in an oversintering region, which may cause degradations in properties, such as a decrease in IR (Insulation Resistance) or dielectric breakdown voltage, and the like. Since the sintering temperature generally does not exceed 1,200° C., the upper limit of the sintering temperature may be limited to 1,200° C. or less.

Also, maintaining times h1 and h2 for the first and second reoxidation heat treatments are not limited to any particular duration. For example, each of the first and second reoxidation heat treatments may be performed for a duration of 8-12 hours.

Also, the oxidizing atmosphere may be a gas atmosphere in which nitrogen gas ($N_2$) is mixed with more than 0% to 0.1% or less hydrogen gas ($H_2$), or a gas atmosphere in which nitrogen gas ($N_2$) is mixed with more than 0% to 0.01% or less oxygen gas ($O_2$).

Hydrogen gas and oxygen gas may be used for the purpose of controlling the oxygen partial pressure inside a heat treatment furnace when the heat treatments are performed.

Hydrogen gas may be introduced for the purpose of suppressing oxidation of internal electrodes, whereas oxygen gas may be introduced more for the purpose of filling oxygen vacancies.

In general, when the hydrogen gas is introduced in an amount of 0.1%, the oxygen partial pressure may be in the range of $10^{-12}$-$10^{-14}$ atm (where the atmospheric pressure is 1 atm).

The oxygen partial pressure may change in accordance with the pressure of steam introduced together.

In addition, before the second reoxidation heat treatment is performed, an operation of cooling a body having undergone the first reoxidation heat treatment may be further comprised.

Capacitor Component

Figure 6:
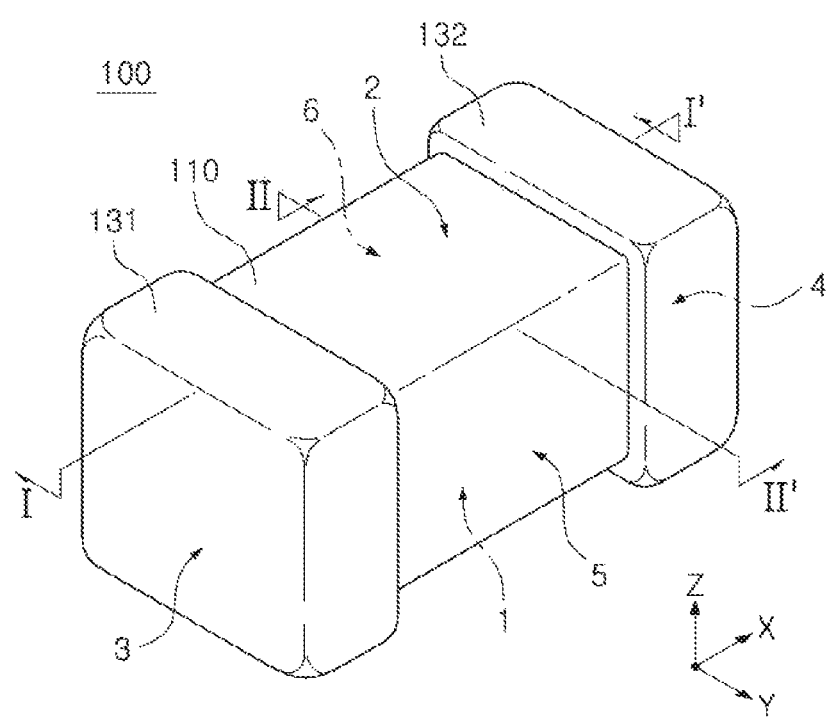
FIG. 6 is a schematic perspective view of a capacitor component according to another exemplary embodiment in the present disclosure.

FIG. 6 is a schematic perspective view of a capacitor component according to another exemplary embodiment in the present disclosure.

Figure 7:
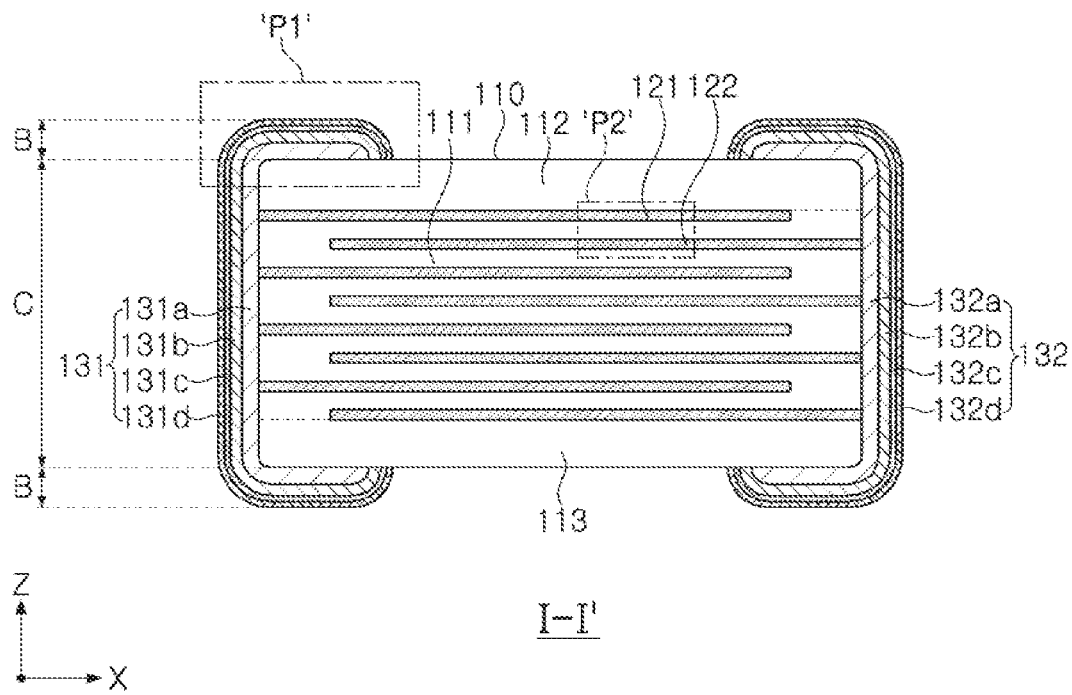
FIG. 7 is a schematic cross-sectional view of the capacitor component taken along line I-I' in FIG. 6.

FIG. 7 is a schematic cross-sectional view of the capacitor component taken along line I-I' shown in FIG. 6.

Figure 8:
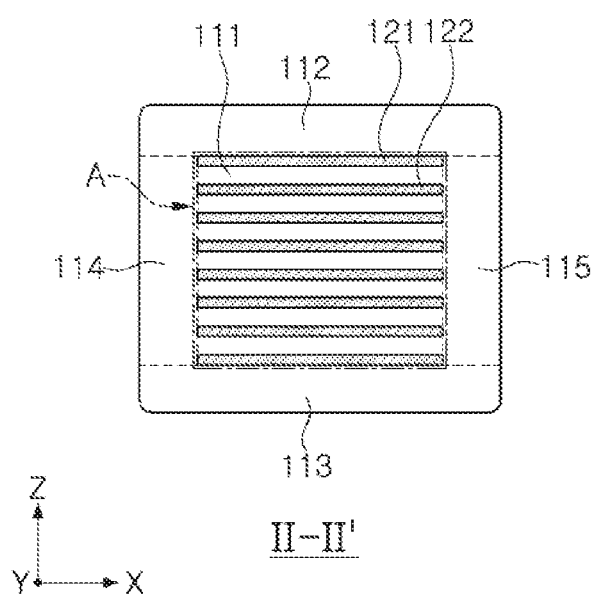
FIG. 8 is a schematic cross-sectional view of the capacitor component taken along line II-II' in FIG. 6.

FIG. 8 is a schematic cross-sectional view of the capacitor component taken along line II-II' shown in FIG. 6.

Figure 9A:
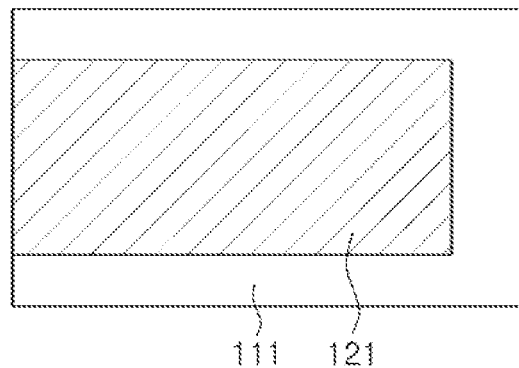
FIG. 9A illustrates a ceramic green sheet in which a first internal electrode is printed on a dielectric layer.
Figure 9B:
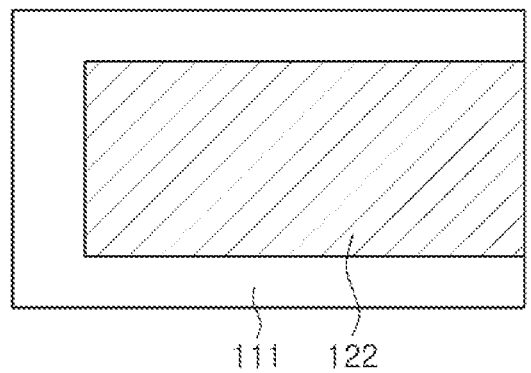
FIG. 9B illustrates a ceramic green sheet in which a second internal electrode is printed on a dielectric layer.

FIG. 9A illustrates a ceramic green sheet in which a first internal electrode is printed on a dielectric layer, and FIG. 9B illustrates a ceramic green sheet in which a second internal electrode is printed on a dielectric layer.

Figure 10:
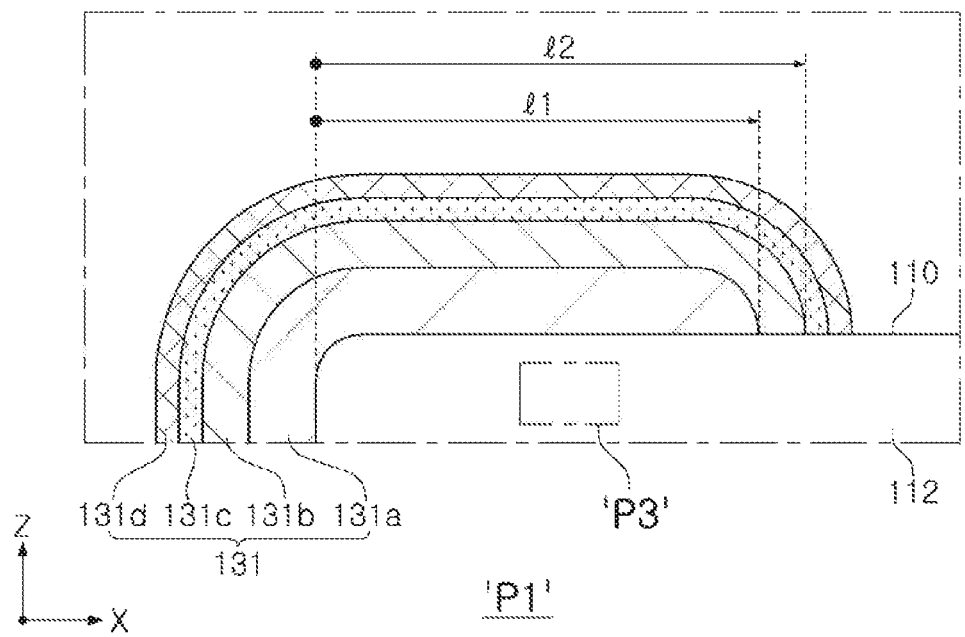
FIG. 10 is an enlarged view of region P1 shown in FIG. 7.

FIG. 10 is an enlarged view of region P1 shown in FIG. 7.

Figure 11:
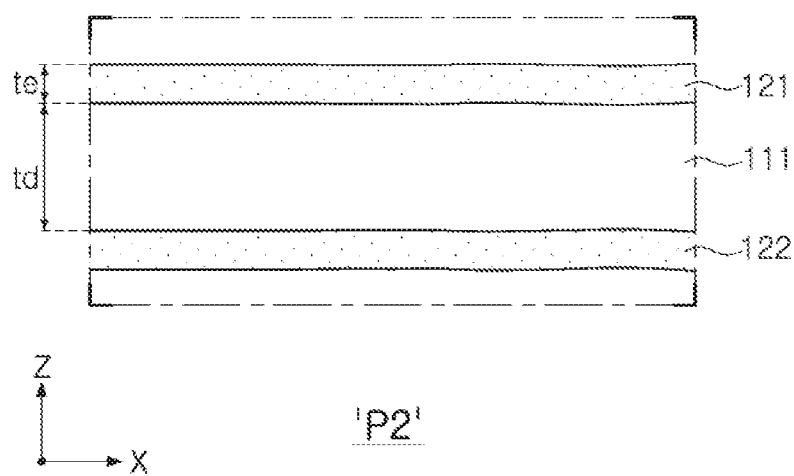
FIG. 11 is an enlarged view of region P2 shown in FIG. 7.

FIG. 11 is an enlarged view of region P2 shown in FIG. 7.

A capacitor component according to another exemplary embodiment will be described in detail with reference to FIGS. 6 through 11.

The capacitor component according to another exemplary embodiment maybe manufactured by the method for manufacturing a capacitor component according to the above-described exemplary embodiment.

According to another exemplary embodiment in the present disclosure, a capacitor component 100 includes: a body 110 including a dielectric layer 111 and first and second internal electrodes 121 and 122 opposing each other with the dielectric layer interposed therebetween, and having first and second surfaces 1 and 2 opposing each other, third and fourth surfaces 3 and 4 connected to the first and second surfaces and opposing each other, and fifth and sixth surfaces 5 and 6 connected to the first to fourth surfaces and opposing each other; and first and second external electrodes 131 and 132 disposed on an outer side of the body 110 and connected to the first and second internal electrodes 121 and 122, respectively, wherein the body 110 includes a capacitance forming portion A including the first and second internal electrodes 121 and 122 opposing each other with the dielectric layer 111 interposed therebetween to form capacitance, cover portions 112 and 113 disposed in upper and lower portions of the capacitance forming portion and including a plurality of pores 11c, and margin portions 114 and 115 disposed on side surfaces of the capacitance forming portion, and a substantial portion of the plurality of pores 11c are filled with glass 11d.

In the body 110, the dielectric layer 111 and the internal electrodes 121 and 122 may be alternately laminated.

The shape of the body 110 is not limited to any particular shape, but as illustrated, the body 110 may have a hexahedron shape or a shape similar thereto. Due to shrinkage of a ceramic powder contained in the body 110 during a sintering process, the body 110 may not be an exact hexahedron with completely straight lines, but may have a substantially hexahedron shape.

The body 110 may have first and second surfaces 1 and 2 opposing each other in a thickness direction (a Z direction), third and fourth surfaces 3 and 4 connected to the first and second surfaces 1 and 2 and opposing each other in a length direction (an X direction), and fifth and sixth surfaces 5 and 6 connected to the first and second surfaces 1 and 2, connected to the third and fourth surfaces 3 and 4, and opposing each other in a width direction (a Y direction).

A plurality of dielectric layers 111 forming the body 110 may be in a sintered state and may be integrated with one another such that boundaries between adjacent dielectric layers 111 are difficult to identify without using a scanning electron microscope (SEM).

According to the exemplary embodiment, the material forming the dielectric layer 111 is not limited to any particular material as long as sufficient capacitance can be obtained therefrom. For example, as the material forming the dielectric layer 111, a barium titanate-based material, a lead composite perovskite-based material, or a strontium titanate-based material may be used.

As the material forming the dielectric layer 111, various ceramic additives, organic solvents, plasticizers, binders, dispersing agents, or the like, maybe added to powder particles such as barium titanate ($BaTiO_3$) powder particles or the like, according to the purpose of the present disclosure.

A plurality of internal electrodes 121 and 122 may be disposed opposing each other with the dielectric layer 111 interposed therebetween.

The internal electrodes 121 and 122 may include first and second internal electrodes 121 and 122 alternately disposed while opposing each other with the dielectric layer 111 interposed therebetween.

The first and second internal electrodes 121 and 122 may be exposed to the third and fourth surfaces 3 and 4 of the body 110, respectively.

Referring to FIG. 7 and FIG. 8, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body 110 and connected to the first internal electrode 121, and the second external electrode 132 may be disposed on the fourth surface 4 of the body 110 and connected to the second internal electrode 122.

The first and second internal electrodes 121 and 122 may be electrically insulated from each other by the dielectric layer 111 interposed therebetween. The body 110 may be formed by alternately laminating in a thickness direction (a Z direction) a ceramic green sheet of FIG. 9A, having a first internal electrode 121 printed on a dielectric layer 111, and a ceramic green sheet of FIG. 9B, having a second internal electrode 122 printed on a dielectric layer 111, and sintering the laminated ceramic green sheets of FIGS. 9a and 9b.

A printing method of the conductive paste may be a screen printing method, a gravure printing method, or the like, but is not limited thereto.

A capacitor component 100 according to an exemplary embodiment may include a capacitance forming portion A disposed inside the body 110 and including a first internal electrode 121 and a second internal electrode 122 opposing each other with the dielectric layer 111 interposed therebetween to form capacitance, cover portions 112 and 113 disposed in upper and lower portions of the capacitance forming portion A, and margin portions 114 and 115 disposed on side surfaces of the capacitance forming portion A.

The capacitance forming portion A contributes to forming the capacitance of a capacitor, and may be formed by repeatedly laminating a plurality of first and second internal electrodes 121 and 122 with a dielectric layer 111 disposed therebetween.

The upper cover portion 112 and the lower cover portion 113 may be formed by laminating a single dielectric layer, or two or more dielectric layers on upper and lower surfaces of the capacitance forming portion A in upward and downward directions, respectively, and may serve to basically protect the internal electrodes from being damaged by physical or chemical stress.

The upper cover portion 112 and the lower cover portion 113 may not include internal electrodes, and may contain the same material as the dielectric layer 111.

In detail, as the material forming the upper cover portion 112 and the lower cover portion 113, various ceramic additives, organic solvents, plasticizers, binders, dispersing agents, or the like, maybe added to powder particles such as barium titanate ($BaTiO_3$) powder particles and the like, according to the purpose of the present disclosure.

Figure 12:
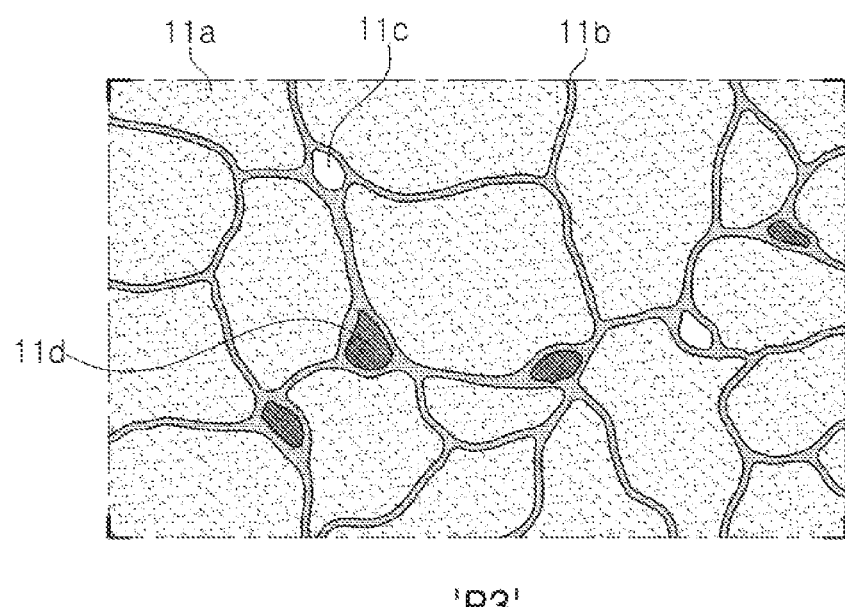
FIG. 12 is an enlarged view of region P3 shown in FIG. 10.

FIG. 12 is an enlarged view of region P3 shown in FIG. 10, which is a cover portion 112 adjacent to a band portion B of an external electrode.

Referring to FIG. 12, the cover portions 112 and 113 may include a plurality of pores 11c, and a substantial portion (e.g., 80% or higher) of the plurality of pores 11c may be filled with glass 11d. More preferably, 90% or more of the plurality of pores 11c may be filled with the glass 11d.

In addition, the cover portions 112 and 113 may include a plurality of dielectric grains 11a and dielectric grain boundaries 11b, and the plurality of pores 11c may be included in the dielectric grain boundaries.

When 80% or higher of the plurality of pores 11c are filled with the glass 11d, hardness may be improved, and paths through which a plating liquid or humidity could permeate may be reduced, and thus, reliability may be improved.

First and second oxidation operations maybe performed according to the method described above to fill 80% or higher of a total number of the plurality of pores 11c with the glass 11d.

For example, a diameter of each of the pores 11c may be in the range of 1 to 2 μm.

In addition, a hardness of the cover portions 112 and 113 is not limited to any particular value since the hardness may vary depending on additives, binders, or the like, contained therein. However, referring to FIG. 4, when the first and second reoxidation operations were performed according to the method described above, such as in Sample 2, the cover portions 112 and 113 could achieve hardness equal to, or even greater than, 1,000 $kgf/mm^2$.

The margin portions 114 and 115 may include a margin portion 114 disposed on the sixth surface 6 of the body 110, and a margin portion 115 disposed on the fifth surface 5 of the body 110.

In particular, the margin portions 114 and 115 may be disposed on both side surfaces of the body 110 in a width direction.

In a cross-section of the body 110 cut in a width-thickness (W-T) direction, as illustrated in FIG. 8, the margin portions 114 and 115 refer to regions disposed between both ends of the first and second internal electrodes 121 and 122 and outer surfaces of the body 110.

The margin portions 114 and 115 may serve to basically protect the internal electrodes 121 and 122 from being damaged by physical or chemical stress.

The external electrodes 131 and 132 may be disposed on an outer side of the body 110 and connected to the first and second internal electrodes 121 and 122. As illustrated in FIG. 7, the external electrodes 131 and 132 may include a first external electrode 131 connected to a first internal electrode 121, and a second external electrode 132 connected to a second internal electrode 122.

The first and second external electrodes 131 and 132 may be electrically connected to the first and second internal electrodes 121 and 122, respectively, to form capacitance, and the second external electrode 132 may be connected to an electric potential different from an electric potential of the first external electrode 131.

The external electrodes 131 and 132 may include electrode layers 131a and 132a connected to the internal electrodes 121 and 122, and conductive resin layers 131b and 132b disposed on the electrode layers 131a and 132a.

Further, the external electrodes 131 and 132 may include Ni-plated layers disposed on the conductive resin layers 131b and 132b, and Sn-plated layers 131d and 132d disposed on the Ni-plated layers 131b and 132b.

When the external electrodes 131 and 132 include the first external electrode 131 and the second external electrode 132, the external electrode 131 may include a first electrode layer 131a, a first conductive resin layer 131b, a first Ni-plated layer 131c, and a first Sn-plated layer 131d, and the second external electrode 132 may include a second electrode layer 132a, a second conductive resin layer 132b, a first Ni-plated layer 132c, and a first Sn-plated layer 132d.

The electrode layers 131a and 132a may include a conductive metal and glass.

The conductive metal used for the electrode layers 131a and 132a is not limited to any particular material as long as it can be electrically connected to the internal electrodes 121 and 122 to form capacitance. For example, the conductive metal may be at least one selected from the group consisting of copper (Cu), silver (Ag), nickel (Ni), and alloys thereof.

The electrode layers 131a and 132a may be formed by adding glass frits to the conductive metal powder to prepare a conductive paste, and applying and sintering the conductive paste.

The conductive resin layers 131b and 132b maybe formed on the electrode layers 131a and 132a, and may be formed in a shape that completely covers the electrode layers 131a and 132a.

The conductive resin layers 131b and 132b may include a conductive metal and a base resin.

The base resin contained in the conductive resin layers 131b and 132b is not limited to any particular material as long as it has bonding properties and shock absorption abilities, and forms paste when mixed with a conductive metal powder. For example, the base resin may include an epoxy-based resin.

The conductive metal included in the conductive resin layers 131b and 132b is not limited to any particular material as long as it can be electrically connected to the electrode layers 131a and 132a. For example, the conductive metal may include at least one selected from the group consisting of copper (Cu), silver (Ag), nickel (Ni), and alloys thereof.

The Ni-plated layers 131c and 132c may be formed on the conductive resin layers 131b and 132b, and may be formed in a shape that completely covers the conductive resin layers 131b and 132b.

The Sn-plated layers 131d and 132d may be formed on the Ni-plated layers 131c and 132c, respectively, and may be formed in a shape that completely covers the Ni-plated layers 131c and 132c, respectively.

The Sn-plated layers 131d and 132d may serve to improve mounting characteristics.

The first external electrode 131 may include a connection portion C disposed on the third surface of the body 110 and a band portion B extending from the connection portion C to portions of the first and second surfaces. Similarly, the second external electrode 132 may include a connection portion disposed on the fourth surface of the body 110 and a band portion extending from the connection portion to portions of the first and second surfaces.

In particular, the band portion B may extend not only to the portions of the first and second surfaces 1 and 2, but also to portions of the fifth and sixth surfaces 5 and 6 from the connection portion C.

Referring to FIG. 10, of the first external electrode 131, a distance l1 from the third surface 3 of the body 110 to an end of the band portion B of the first electrode layer 131a may be shorter than a distance l2 from the third surface 3 of the body 110 to an end of the band portion B of the first conductive resin layer 131b.

Similarly, of the second external electrode 132, a distance from the fourth surface 4 of the body 110 to an end of the band portion B of the second electrode layer 132a may be shorter than a distance from the fourth surface 4 of the body 110 to an end of the band portion B of the second conductive resin layer 132b.

Accordingly, the conductive resin layers 131b and 132b may be formed in a shape that completely covers the electrode layers 131a and 132a, and may improve bending strength characteristics and bonding strength between the external electrodes and the body.

Referring to FIG. 11, a capacitor component according to another exemplary embodiment may satisfy td>2*te, where td is a thickness of the dielectric layer 111, and te is a thickness of each of the internal electrodes 121 and 122.

According to another exemplary embodiment, the thickness td of the dielectric layer 111 may be twice the thickness te of each of the internal electrodes 121 and 122.

In general, high-voltage vehicle electronic components tend to suffer reliability issues caused by a decrease in dielectric breakdown voltage in a high-voltage environment.

A capacitor component according to another exemplary embodiment may have improved dielectric breakdown voltage characteristics by setting the thickness td of the dielectric layer 111 to be more than twice the thickness te of each of the internal electrodes 121 and 122 to prevent a decrease in dielectric breakdown voltage in a high-voltage environment, thereby increasing the thickness of the dielectric layer, which corresponds to a distance between the internal electrodes.

When the thickness td of the dielectric layer 111 is twice or less than the thickness te of each of the internal electrodes 121 and 122, the thickness of the dielectric layer may be too small, thus causing an undesirable decrease in dielectric breakdown voltage.

For example, the thickness te of the internal electrode may be less than 1 μm, and the thickness td of the dielectric layer may be less than 2.8 μm, without being limited thereto.

As set forth above, according to an exemplary embodiment in the present disclosure, conditions of a reoxidation process may be controlled to significantly reduce the quantity of oxygen vacancies, significantly lower the number of pores present in cover portions by filling the pores with glass, and achieve a highly densified microstructure.

Accordingly, the reliability of a multilayer ceramic capacitor may be improved, and the hardness of the cover portions may be increased.

While the exemplary embodiments have been shown and described above in detail, the present invention is not limited by the above-described exemplary embodiments and accompanying drawings, but by the appended claims. Accordingly, it will be apparent to those skilled in the art that modifications and variations could be made without departing from the scope of the present invention as defined by the appended claims.

What is claimed is:

1. A capacitor component comprising:
a body including a dielectric layer and first and second internal electrodes opposing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
first and second external electrodes disposed on an outer side of the body and electrically connected to the first and second internal electrodes, respectively,
wherein the body includes a capacitance forming portion including the first and second internal electrodes opposing each other with the dielectric layer interposed therebetween to form capacitance, cover portions disposed in upper and lower surfaces of the capacitance forming portion and including a plurality of pores, and margin portions disposed on side surfaces of the capacitance forming portion, and
a substantial portion of the plurality of pores are filled with glass,
wherein a diameter of each of the plurality of pores is in the range of 1-2 μm.

2. A method for manufacturing the capacitor component of claim 1, comprising:
an operation of sintering, under a moderately-or-more reducing atmosphere for hydrogen, a body in which a plurality of dielectric layers having internal electrodes printed thereon are laminated;
a first reoxidation operation of subjecting the sintered body to a first reoxidation heat treatment under an oxidizing atmosphere; and
a second reoxidation operation of subjecting the body having undergone the first reoxidation heat treatment to a second reoxidation heat treatment under the oxidizing atmosphere.

3. The method for manufacturing a capacitor component of claim 1, wherein each of the first and second reoxidation heat treatments is performed at a temperature of 800-1,200° C.

4. The method for manufacturing a capacitor component of claim 1, wherein each of the first and second reoxidation heat treatments is performed for a duration of 8-12 hours.

5. The method for manufacturing a capacitor component of claim 1, wherein the moderately-or-more reducing atmosphere for hydrogen is a gas atmosphere in which nitrogen gas ($N_2$) is mixed with 1% or more to 2% or less hydrogen gas ($H_2$).

6. The method for manufacturing a capacitor component of claim 1, wherein the oxidizing atmosphere is a gas atmosphere in which nitrogen gas ($N_2$) is mixed with more than 0% to 0.1% or less hydrogen gas ($H_2$), or a gas atmosphere in which nitrogen gas ($N_2$) is mixed with more than 0% to 0.01% or less hydrogen gas ($H_2$).

7. The method for manufacturing a capacitor component of claim 1, further comprising an operation of cooling the body having undergone the first reoxidation heat treatment before the second reoxidation heat treatment.

8. The method for manufacturing a capacitor component of claim 1, wherein the operation of sintering is performed at a temperature of 1,000-1,200° C.

9. The method for manufacturing a capacitor component of claim 1, wherein the operation of sintering is performed at a temperature higher than temperatures of the first and second re-oxidation heat treatments.

10. The capacitor component of claim 1, wherein the glass includes at least one selected from silicon oxide, aluminum oxide, and complex oxides thereof.

11. The capacitor component of claim 1, wherein a thickness of each of the first and second internal electrodes is less than 1 μm, and a thickness of the dielectric layer is less than 2.8 μm.

12. The capacitor component of claim 1, wherein the relationship of td>2* te is satisfied, where "te" is a thickness of each of the first and second internal electrodes, and "td" is a thickness of the dielectric layer.

13. The capacitor component of claim 1, wherein each of the first and second external electrodes includes an electrode layer and a conductive resin layer disposed on the electrode layer.

14. The capacitor component of claim 13, wherein the electrode layer includes glass and at least one conductive metal selected from a group consisting of copper (Cu), silver (Ag), nickel (Ni), and alloys thereof.

15. The capacitor component of claim 13, wherein the conductive resin layer includes a base resin and at least one conductive metal selected from a group consisting of copper (Cu), silver (Ag), nickel (Ni), and alloys thereof.

16. The capacitor component of claim 13, wherein the first external electrode is disposed on the third surface and includes a band portion extending to portions of the first and second surfaces, and a distance from the third surface to an end of a band portion of the electrode layer is smaller than a distance from the third surface to an end of a band portion of the conductive resin layer.

17. The capacitor component of claim 13, wherein each of the first and second external electrodes further includes a Ni-plated layer disposed on the conductive resin layer, and a Sn-plated layer disposed on the Ni-plated layer.

18. A capacitor component comprising:
a body including a dielectric layer and first and second internal electrodes opposing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
first and second external electrodes disposed on an outer side of the body and electrically connected to the first and second internal electrodes, respectively,
wherein the body includes a capacitance forming portion including the first and second internal electrodes opposing each other with the dielectric layer interposed therebetween to form capacitance, cover portions disposed in upper and lower surfaces of the capacitance forming portion and including a plurality of pores, and margin portions disposed on side surfaces of the capacitance forming portion, and
a substantial portion of the plurality of pores are filled with glass,
wherein the cover portions have a hardness of 1,000 kgf/mm$^2$ or more obtained by performing a reoxidation operation twice.

19. The capacitor component of claim 18, wherein the reoxidation operation comprises:
a first reoxidation operation of subjecting the body after an operation of sintering to a first reoxidation heat treatment under an oxidizing atmosphere; and
a second reoxidation operation of subjecting the body having undergone the first reoxidation heat treatment to a second reoxidation heat treatment under the oxidizing atmosphere
wherein each of the first and second reoxidation heat treatments is performed at a temperature of 800-1,200° C.

* * * * *